(12) United States Patent
Lee

(10) Patent No.: US 11,575,601 B2
(45) Date of Patent: Feb. 7, 2023

(54) NETWORK DEVICE AND PACKET PROCESSING METHOD USING SAME

(71) Applicant: SK TELECOM CO., LTD., Seoul (KR)

(72) Inventor: Dong Jin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 17/283,314

(22) PCT Filed: Sep. 19, 2019

(86) PCT No.: PCT/KR2019/012120
§ 371 (c)(1),
(2) Date: Apr. 7, 2021

(87) PCT Pub. No.: WO2020/085654
PCT Pub. Date: Apr. 30, 2020

(65) Prior Publication Data
US 2022/0006735 A1 Jan. 6, 2022

(30) Foreign Application Priority Data
Oct. 26, 2018 (KR) .................... 10-2018-0129229

(51) Int. Cl.
*H04L 45/74* (2022.01)
*H04L 47/24* (2022.01)
(Continued)

(52) U.S. Cl.
CPC .............. *H04L 45/74* (2013.01); *H04L 47/24* (2013.01); *H04L 47/34* (2013.01); *H04L 67/14* (2013.01)

(58) Field of Classification Search
CPC ......... H04L 45/74; H04L 47/24; H04L 47/34; H04L 67/14; H04L 29/12; H04L 61/2007; H04W 28/12
See application file for complete search history.

(56) References Cited

U.S. PATENT DOCUMENTS 10,412,625 B1 * 9/2019 Yan ..................... H04L 47/125
10,779,254 B2 * 9/2020 Lee ..................... H04L 47/821
(Continued)

FOREIGN PATENT DOCUMENTS

KR 10-2018-0106509 10/2018
KR 10-2018-0106836 10/2018
(Continued)

OTHER PUBLICATIONS

International Search Report dated Jan. 2, 2020 issued in Application No. PCT/KR2019/012120.
(Continued)

*Primary Examiner* — Kibrom T Hailu
(74) *Attorney, Agent, or Firm* — Ked & Associates LLP

(57) ABSTRACT

In accordance with an aspect of the present disclosure, there is provided a network function (NF). The NF comprises, a communication unit configured to receive, from another NF, a message regarding association between the NF and the another NF; and a message processing unit configured to obtain, from the received message, delivery information for a message to be transmitted to the another NF, and to transmit the message to be transmitted to the another NF based on the obtained delivery information to the another NF.

18 Claims, 6 Drawing Sheets

| Message Type | Associated Address | Associated Reliability | Resource Priority |
|---|---|---|---|
| Message Type 1<br>(예: Session Est. Req.) | • Source Address="..."<br>• Destination Address="..."<br>• Source Port="8801"<br>• Destination Port="..." | • Seq. No="Incremental"<br>• Expiry Timeout="0.5s"<br>• Max. Retry="10" | • 1 (very high)<br>• 2 (high)<br>• 3 (medium)<br>• 4 (low)<br>• 5 (very low) |
| Message Type 2<br>(예: Session Mod. Req.) | • Source Address="..."<br>• Destination Address="..."<br>• Source Port="8802"<br>• Destination Port="..." | • SeqNo="Incremental"<br>• Expiry Timeout="0.4s"<br>• Max. Retry="20" | • 1 (very high)<br>• 2 (high)<br>• 3 (medium)<br>• 4 (low)<br>• 5 (very low) |
| Message Type 3<br>(예: Session Report. Res.) | • Source Address="..."<br>• Destination Address="..."<br>• Source Port="8899"<br>• Destination Port="..." | • SeqNo="Incremental"<br>• Expiry Timeout="0.01s"<br>• Max. Retry="100" | • 1 (very high)<br>• 2 (high)<br>• 3 (medium)<br>• 4 (low)<br>• 5 (very low) |
| ... | | | |
| Message Type N | | | |

(51) Int. Cl.
*H04L 47/34* (2022.01)
*H04L 67/14* (2022.01)

(56) References Cited

U.S. PATENT DOCUMENTS

| | | | |
|---|---|---|---|
| 10,849,186 B2* | 11/2020 | Dao | H04W 36/0016 |
| 10,938,583 B2* | 3/2021 | Qiao | H04W 4/24 |
| 10,951,427 B2* | 3/2021 | Qiao | H04W 4/24 |
| 2018/0098325 A1 | 4/2018 | Pang et al. | |
| 2018/0270715 A1* | 9/2018 | Lee | H04W 36/0011 |
| 2018/0270778 A1* | 9/2018 | Bharatia | H04L 65/1073 |
| 2019/0007992 A1* | 1/2019 | Kim | H04W 76/27 |
| 2019/0116521 A1* | 4/2019 | Qiao | H04L 69/04 |
| 2020/0120570 A1* | 4/2020 | Youn | H04W 76/11 |
| 2020/0137776 A1* | 4/2020 | Lee | H04L 5/0044 |
| 2021/0007038 A1* | 1/2021 | Li | H04W 36/32 |
| 2021/0289566 A1* | 9/2021 | Jimenez Cordon | H04W 4/24 |
| 2021/0297535 A1* | 9/2021 | Puente Pestaña | H04L 12/1407 |

FOREIGN PATENT DOCUMENTS

| | | |
|---|---|---|
| KR | 10-2018-0106998 | 10/2018 |
| KR | 10-2018-0109714 | 10/2018 |

OTHER PUBLICATIONS

Samsung et al: "TS 23.502: N4 session management for SMF and UPF interactions," vol. SA WG2, No. Ljubljana, Slovenia; Oct. 23, 2017-Oct. 27, 2017.

Huawei et al: "Update of N4 Parameter Descriptions and Tables", vol. SA WG2, No. Newport Beach, USA; May 28, 2018-Jun. 1, 2018.

"3rd Generation Partnership Project; Technical Specification Group Core Network and Terminals; 5G System; Technical Realization of Service Based Architecture; Stage 3 (Release 15)", vol. CT WG4, No. V15.1.0, France, Sep. 22, 2018.

Extended European Search Report in European Application No. 19875169.5 dated Nov. 7, 2022.

* cited by examiner

*FIG.5*

| Message Type | Associated Address | Associated Reliability | Resource Priority |
|---|---|---|---|
| Message Type 1<br>(예: Session Est. Req.) | • Source Address="..."<br>• Destination Address="..."<br>• Source Port="8801"<br>• Destination Port="..." | • Seq. No="Incremental"<br>• Expiry Timeout="0.5s"<br>• Max. Retry="10" | • 1 (very high)<br>• 2 (high)<br>• 3 (medium)<br>• 4 (low)<br>• 5 (very low) |
| Message Type 2<br>(예: Session Mod. Req.) | • Source Address="..."<br>• Destination Address="..."<br>• Source Port="8802"<br>• Destination Port="..." | • SeqNo="Incremental"<br>• Expiry Timeout="0.4s"<br>• Max. Retry="20" | • 1 (very high)<br>• 2 (high)<br>• 3 (medium)<br>• 4 (low)<br>• 5 (very low) |
| Message Type 3<br>(예: Session Report. Res.) | • Source Address="..."<br>• Destination Address="..."<br>• Source Port="8899"<br>• Destination Port="..." | • SeqNo="Incremental"<br>• Expiry Timeout="0.01s"<br>• Max. Retry="100" | • 1 (very high)<br>• 2 (high)<br>• 3 (medium)<br>• 4 (low)<br>• 5 (very low) |
| ... | | | |
| Message Type N | | | |

NETWORK DEVICE AND PACKET PROCESSING METHOD USING SAME

CROSS-REFERENCE TO RELATED APPLICATION

This application is a U.S. National Stage Application under 35 U.S.C. § 371 of PCT Application No. PCT/KR2019/012120, filed on Sep. 19, 2019, which claims priority to Korean Patent Application No. 10-2018-0129229, filed on Oct. 26, 2018. The entire contents of the application on which the priority is based are incorporated herein by reference.

TECHNICAL FIELD

The present disclosure relates to a network function and a packet processing method using the network function.

BACKGROUND

As a type of a communication service and expected data rate, etc. are diversified in the LTE communication system, expansion of the LTE frequency and evolution to the 5G communication system are actively progressing.

The rapidly evolving 5G communication system not only accommodates as many user equipments as possible based on limited radio resources but also supports scenarios of enhanced mobile broadband (eMBB), massive machine type communications (mMTC), and ultra-reliable and low latency communications (URLLC).

In the 5G communication system, the network structure to support, from end to end, the user equipments, base stations (radio access networks), cores, and servers is defined. Further, the control signaling functions and data transmission/reception functions that is performed in combination by a single node (e.g., S-GW, P-GW, etc.) in the existing LTE (4G) communication system are separated in the 5G communication system. Accordingly, a network structure that separates the Control Plane for the control signaling functions and the User Plane for the data transmission/reception functions is defined.

In this case, various nodes are included in the Control Plane. For example, the Access and Mobility Management Function (AMF) that controls wireless access of the user equipment, the Policy Control Function (PCF) that manages/controls policies such as user equipment information and subscription service information for each user equipment, billing, and the like, the Session Management Function (SMF) that manages/controls a session for using data services for each user equipment, and the Network Exposure Function (NEF) that performs an information sharing function with an external network may be included in the Control Plane.

In addition, functions such as the User Plane Function (UPF) may be included in the User Plane.

SUMMARY

Various messages are transmitted between a SMF and a UPF through an N4 interface by using a packet forwarding control protocol (PFCP). The transmitted message may include, for example, a session message, QoS, usage (billing), and the like.

The problem to be solved by the present disclosure is to provide a technology that enables the above-described message to be transmitted through the N4 interface between the SMF and the UPF to be transmitted in real time without loss and delay.

In accordance with an aspect of the present disclosure, there is provided a network function (NF). The NF comprises, a communication unit configured to receive, from another NF, a message regarding association between the NF and the another NF; and a message processing unit configured to obtain, from the received message, delivery information for a message to be transmitted to the another NF, and to transmit the message to be transmitted to the another NF based on the obtained delivery information to the another NF.

In accordance with another aspect of the present disclosure, there is provided a packet processing method performed by a network function (NF). The method comprises, receiving, from another NF, a message regarding association between the NF and the another NF; obtaining, from the received message, delivery information for a message to be transmitted to the another NF; and transmitting, to the another NF, the message to be transmitted to the another NF based on the obtained delivery information.

According to an embodiment, the message transmitted between the SMF and the UPF may be transmitted based on delivery information. In this case, an associated address used for message delivery is not bound to a specific value and may be selected from a number of values, and a specific number (seq. No) may also be selectively assigned to the message. Therefore, overload and delay in the message delivery may be prevented, and stability of the message delivery may also be improved. Through this, connection without delay, QoS guarantee, and real-time billing are possible. In addition, since the associated addresses are assigned for each message, bypass for various switches or routers is possible.

BRIEF DESCRIPTION OF THE DRAWINGS

FIG. 5 shows a table illustrating delivery information according to an embodiment.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
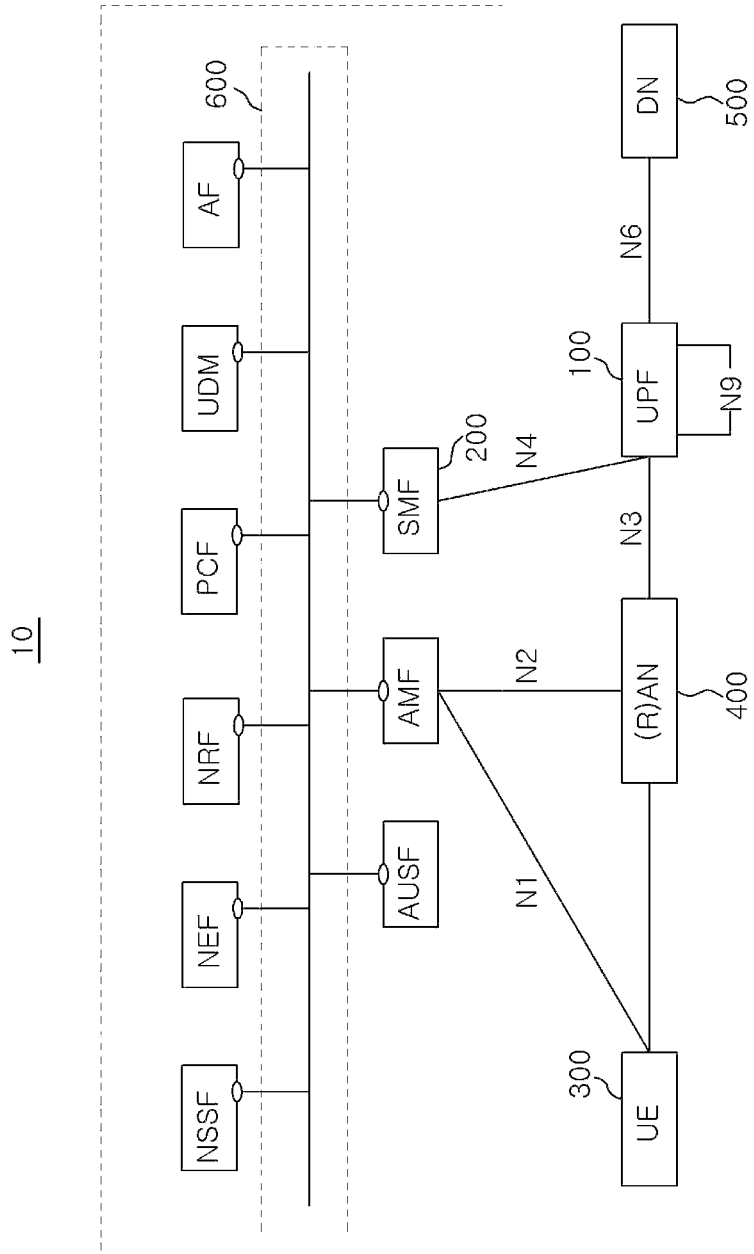
FIG. 1 shows a diagram illustrating an architecture of the 5G system according to an embodiment.

FIG. 1 shows a diagram illustrating an architecture 10 of the 5G system according to an embodiment.

The 5G system represented by the architecture 10 of FIG. 1 will be described. The 5G system is a technology evolved from a 4th generation LTE mobile communication technology. The 5G system is a new Radio Access Technology (RAT) and an expanded technology of the Long Term Evolution (LTE) through an evolution of an existing mobile communication network structure or a clean-state structure, and supports extended LTE (eLTE), non-3GPP access, and the like.

However, because the architecture 10 illustrated in FIG. 1 is just an example, the idea of the present disclosure is not interpreted as being limited to the architecture 10 illustrated in FIG. 1 nor the 5G communication system.

The architecture 10 includes various components (for example, a network function (NF)). Hereinafter, these components will be described.

Referring to FIG. 1, an Authentication Server Function (AUSF), an (Core) Access and Mobility Management Function (AMF), a Session Management Function (SMF) 200, a Policy Control Function (PCF), an Application Function (AF), Unified Data Management (UDM), a Data Network (DN) 500, a User Plane Function (UPF) 100, an (Radio) Access Network ((R)AN) 400 or a base station 400, and a User Equipment (UE) 300, etc. are shown.

Among these components, the UPF 100 is a component included in a user plane in the 5G system. Further, the SMF 200 is a component included in a control plane separated from the user plane.

In addition, referring to FIG. 1, the AUSF, the AMF, the SMF 200, the PCF, the AF, or the UDM, etc. are connected through a service-based interface (SBI) 600. Further, the SMF 200 and UPF 100 are connected through an N4 interface by using a Packet Forwarding Control Protocol (PFCP).

However, according to an embodiment, the SMF 200 and the UPF 100 may be connected through the SBI 600 other than the N4 interface, in this case, an interface connecting the SMF 200 and the UPF 100 may be referred to as an Nupf interface.

Figure 2:
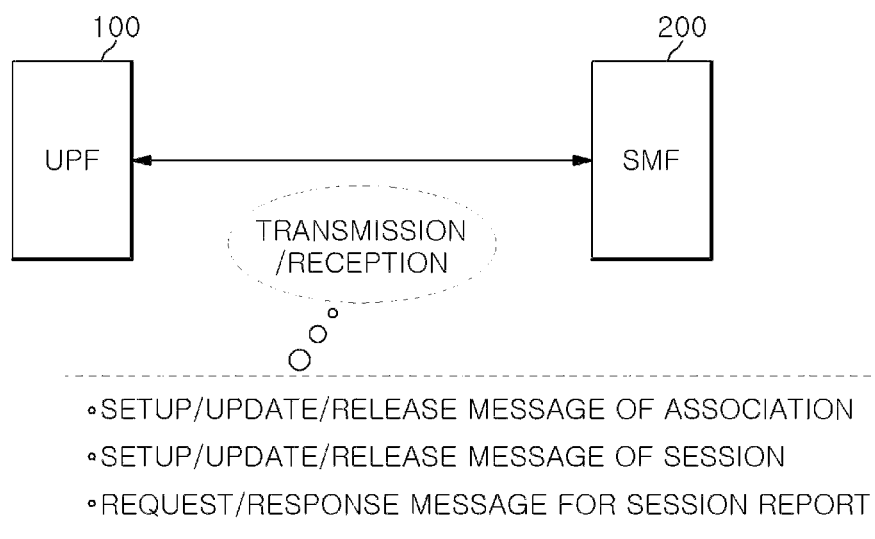
FIG. 2 shows a diagram illustrating a message type transmitted between a UPF and a SMF according to an embodiment.

FIG. 2 shows a diagram illustrating a message type transmitted between the UPF 100 and the SMF 200 according to an embodiment.

First, between the UPF 100 and the SMF 200, various messages regarding control over packet delivery are transmitted through the N4 interface by using a PFCP or the SBI 600 as described above. The transmitted message may include, for example, a request message for setup, update, and release of association, a response message to the request message for the association, a request message for establishment, modification, and release of a session, and a response message to the request message for the session. Further, the transmitted message may include, for example, a request message for a session report, and a response message to the request message for the session report. In addition, although not shown in FIG. 2, a message regarding control over QoS or a message regarding packet usage that is a basis for billing may be included in the transmitted message.

Herein, according to an embodiment, the message regarding the association transmitted between the UPF 100 and the SMF 200 includes delivery information that defines a manner in which a message other than the messages for the association, for example, the messages for the session, the messages for the session report, the message regarding the control over the QoS, or the message regarding the packet usage is transmitted between the UPF 100 and the SMF 200 (Hereinafter, a 'message' is defined as referring to any one of the messages for the session, the messages for the session report, the message regarding the control over the QoS, or the message regarding the packet usage, which is a message other than the messages for the association.)

The UPF 100 transmits a message to the SMF 200 based on the delivery information, and the SMF 200 also transmits a message to the UPF 100 based on the delivery information. If a message is transmitted based on the delivery information, overload of the message may be resolved so that the message may be transmitted without loss or delay. Therefore, distributed arrangement or long-range arrangement may be possible for the UPFs 100. Hereinafter, each of the UPF 100 and the SMF 200 enabling the above-described effect will be described.

Figure 3:
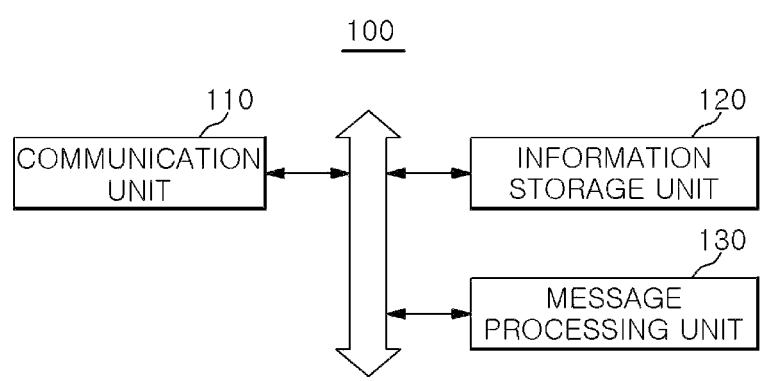
FIG. 3 shows a diagram illustrating a configuration of a UPF according to an embodiment.

FIG. 3 shows a diagram illustrating a configuration of the UPF 100 according to an embodiment. Referring to FIG. 3, the UPF 100 includes a communication unit 110, an information storage unit 120, and a message processing unit 130, but the configuration of the UPF 100 is not limited to that shown in FIG. 3.

First, the communication unit 110 is a port for transmitting and receiving a message, and may be implemented in hardware or software.

The information storage unit 120 may be implemented by a memory or the like. The information storage unit 120 may store delivery information received from the SMF 200 through the communication unit 110, and the delivery information will be described later. On the other hand, not only the delivery information but also other various information may be stored in the information storage unit 120.

The message processing unit 130 generates a message regarding association. The message processing unit 130 may be implemented by a memory storing an instruction programmed to perform a function to be described below and a microprocessor that executes the instruction.

As described above, the message regarding the association includes a request message for setup, update, and release of the association, and a response message to the request message for the association. Through the message regarding the association, a control function over a load of the SMF 200 may be set or released, a buffering function of the UPF 100 may be set or released, and a method in which an IP is allocated to the UPF 100 may be designated, but they are not limited thereto. The message regarding the association generated by the message processing unit 130 is transmitted to the SMF 200 through the communication unit 110.

On the other hand, when the message regarding the association is received from the SMF 200 through the communication unit 110, the message processing unit 130 may perform the setup, the update, or the release of the association according to the received message regarding the association.

The message processing unit 130 generates the delivery information. The generated delivery information is included in the above-described message regarding the association, thereby being transmitted to the SMF 200 through the communication unit 110.

Herein, the delivery information includes at least one of information on a message type, an associated address used for message delivery, associated reliability including items to be controlled for the message delivery, and a resource priority. An example of the delivery information is shown in FIG. 5.

Among them, the message type indicates a type of a message. For example, the message types may include a request message for establishment, modification, and release of a session, a response message to the request message for the session, a request message for a session report, and a response message to the request message for the session report, as well as a message regarding control over QoS or a message regarding packet usage, which is a basis for billing, etc. Herein, the message type may be classified based on a rule included in the message, such as a packet detection rule (PDR), a forward action rule (FAR), a QoS enforcement rule (QER), or a usage report rule (URR). Alternatively, the message type may be classified based on detailed information element included in each of the rules.

Figure 6:
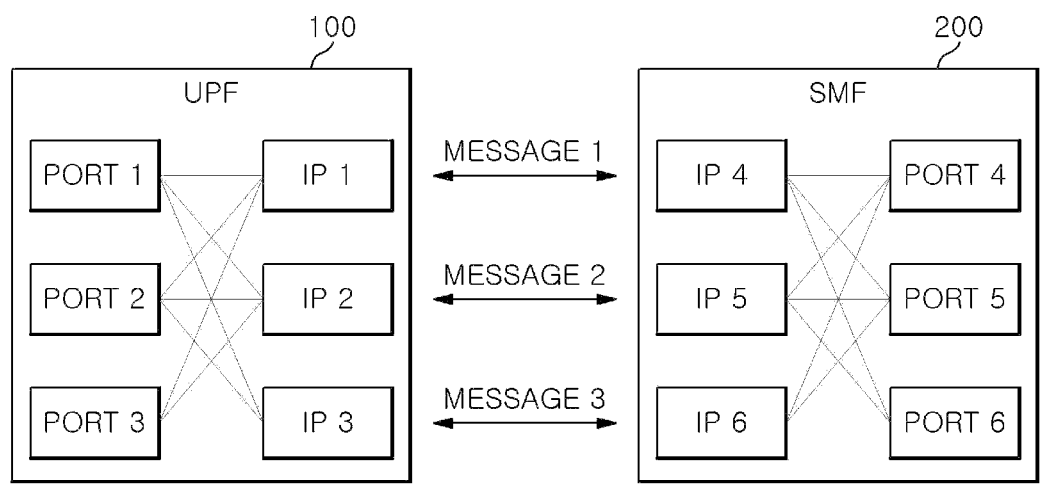
FIG. 6 shows a diagram illustrating details on an available associated address used for message delivery between a UPF and a SMF according to an embodiment.

Further, the associated address used for the message delivery includes a source IP, a destination IP, a source port, and a destination port for the message. Specifically, it may be assumed that N number of IPs and M number of ports (N and M are natural numbers) are available in the UPF 100, and P number of IPs and Q number of ports (P and Q are natural numbers) are available in the SMF 200. In this case, for each message transmitted from the SMF 200 to the UPF 100, the source IP may be selected from the P number of IPs, the source port may be selected from the Q number of ports, the destination IP may be selected from the N number of IPs, and the destination port may be selected from the M number of ports. In other words, the source IP or the destination IP, or the source port or the destination port of a message transmitted from the SMF 200 to the UPF 100 may be selected from a number of Ips or ports rather than be limited or bound to a specific one. Details on the associated address used for the message delivery is illustrated in FIG. 6.

The associated reliability for the message delivery includes at least one of a manner in which a specific number (seq. No) is assigned to a message, standby time (expiry timeout) before receiving a response to a request, and the maximum number of times of re-transmission (max. retry).

Among them, the seq. No is a number that is assigned to each message but does not overlap each other, and is related to an order of processing of a message. The seq. No may be assigned to each message in an incremental manner, or in a randomly selective manner.

The expiry timeout indicates maximum time that the SMF 200 may stand by until receiving a response after transmitting a request for a message to the UPF 100.

The max. retry indicates the maximum number of times that the SMF 200 may re-transmit, after transmitting a request for a message to the UPF 100, the request for the message until a response is received.

The resource priority of the message is information indicating an order in which a resource of the SMF 200 may be allocated to each message. The resource priority may be determined based on at least one of the above-described message type information, the associated address used for the message delivery, and the associated reliability for the message delivery.

Herein, the associated address used for the message delivery and the associated reliability for the message delivery may have different values depending on the message type. For example, the associated address of a message in a case of the message type of the session establishment may be different from the associated address of a message in a case of the message type of the session modification or the session release. In addition, the associated reliability of the message in the case of the message type of the session establishment may be different from the associated reliability of the message in the case of the message type of the session modification or the session release.

The above-described delivery information is included in the message regarding the association and transmitted from the UPF 100 to the SMF 200 through the communication unit 110. A message processing unit 230 of the SMF 200 obtains the delivery information from the received message regarding the association. The obtained delivery information is used in a process in which the SMF 200 transmits a message to the UPF 100. For example, the associated address, the associated reliability, and the resource priority of a message to be transmitted are determined according to the message type of the message, and the message is transmitted from the SMF 200 to the UPF 100 based on the determination.

As described above, according to an embodiment, the delivery information generated by the UPF 100 may be included in the message regarding the association and transmitted to the SMF 200. The SMF 200 may consider the delivery information when transmitting a message to the UPF 100. In this case, the associated address used for the message delivery may not be bound to a specific value and may be selected from a plurality of values, and the seq. No may also be selectively assigned to a message. Therefore, overload and delay in the message delivery may be prevented, and stability of the message delivery may also be improved, thereby enabling connection without delay, QoS guarantee, and real-time billing. In addition, since the associated address is assigned to each message, bypass for various switches or routers is possible.

Heretofore, it was described that the UPF 100 generates the delivery information, and the generated delivery information is transmitted from the UPF 100 to the SMF 200, and the SMF 200 transmits a message based on the delivery information. Hereinafter, it will be described that the SMF 200 generates delivery information, and the generated delivery information is transmitted from the SMF 200 to the UPF 100, and the UPF 100 transmits a message to the SMF 200 based on the delivery information.

Figure 4:
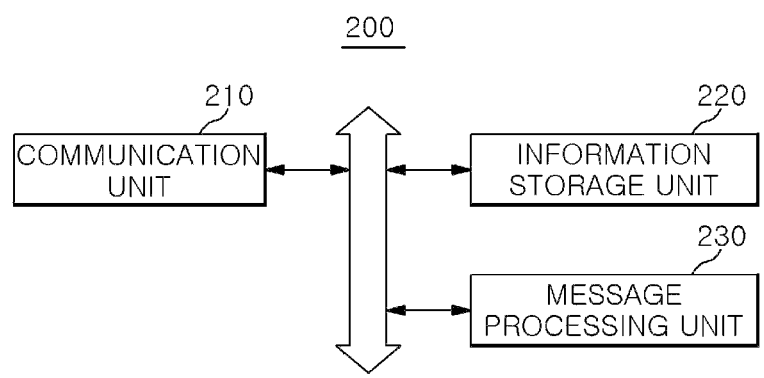
FIG. 4 shows a diagram illustrating a configuration of a SMF according to an embodiment.

FIG. 4 shows a diagram illustrating a configuration of the SMF 200 according to an embodiment. Referring to FIG. 4, the SMF 200 includes a communication unit 210, an information storage unit 220, and the message processing unit 230, but the configuration of the SMF 200 is not limited to that shown in FIG. 4.

First, the communication unit 210 is a port for transmitting and receiving a message, and may be implemented in hardware or software.

The information storage unit 220 may be implemented by a memory or the like. The information storage unit 220 may store delivery information received from the UPF 100 through the communication unit 210, and the delivery information will be described later. On the other hand, not only the delivery information but also other various information may be stored in the information storage unit 220.

The message processing unit 230 generates a message regarding association. Herein, since the message processing unit 230 generates the same message regarding the association that the message processing unit 130 of the UPF 100 generates, a description thereof will be skipped.

The message processing unit 230 generates the delivery information. The generated delivery information is included in the above-described message regarding the association, thereby being transmitted to the UPF 100 through the communication unit 210.

Herein, the delivery information is identical to that of the above description for the UPF 100, and thus a description thereof will be skipped.

The above-described delivery information is included in the message regarding the association and transmitted from the SMF 200 to the UPF 100 through the communication unit 210. The message processing unit 130 of the UPF 100 obtains the delivery information from the received message regarding the association. The obtained delivery information is used in a process in which the UPF 100 transmits a message to the SMF 200. For example, an associated address, associated reliability, and a resource priority of a message to be transmitted are determined according to a message type of the message, and the message is transmitted from the UPF 100 to the SMF 200 based on the determination.

As described above, according to an embodiment, the delivery information generated by the SMF 200 may be included in the message regarding the association and transmitted to the UPF 100. The UPF 100 may consider the delivery information when transmitting a message to the SMF 200. In this case, the associated address used for the message delivery is not bound to a specific value and may be selected from a plurality of values, and the seq. No may also be selectively assigned to a message. Therefore, overload and delay in the message delivery may be prevented, and stability of the message delivery may also be improved, thereby enabling connection without delay, QoS guarantee, and real-time billing. In addition, since the associated address is assigned to each message, bypass for various switches or routers is possible.

Figure 7:
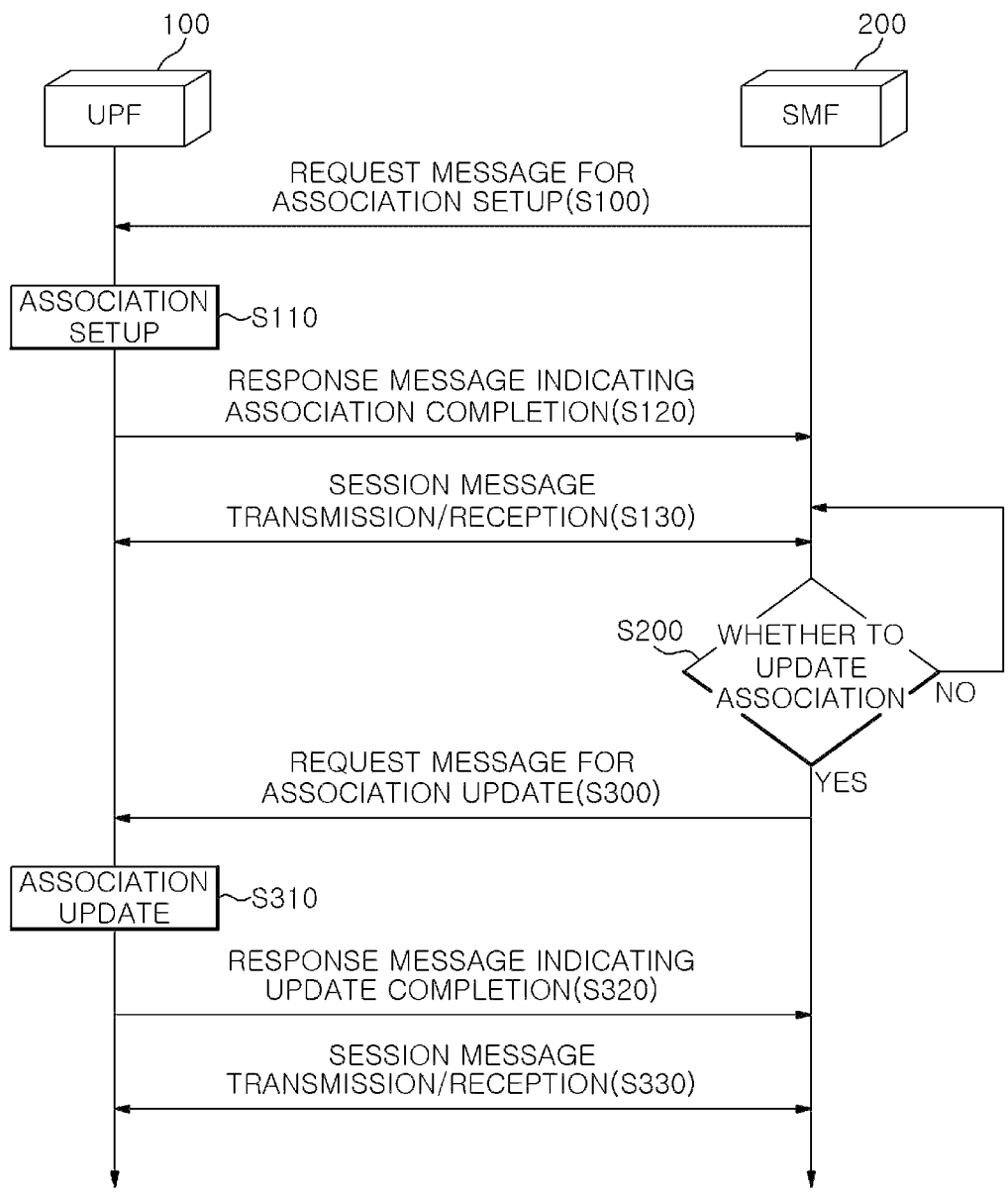
FIG. 7 shows a flowchart illustrating a packet processing method according to an embodiment.

FIG. 7 shows a flowchart illustrating a packet processing method according to an embodiment. However, since FIG. 7 illustrates just an example, a procedure of the packet processing method is not limited to that illustrated in FIG. 7.

Referring to FIG. 7, in a step S100, the SMF 200 transmits a request message for association setup to the UPF 100. The request message for the association setup may be generated by the message processing unit 230 of the SMF 200. The above-described delivery information is included in the request message for the association setup.

In a step S110, the UPF 100 sets up the association according to the request message for the association setup received in the step S100, and then in a step S120, the UPF 100 transmits a response message indicating that the setup of the association has been performed to the SMF 200.

Thereafter, in a step S130, various messages such as a session message are transmitted and received between the UPF 100 and the SMF 200. In this case, the session message to be transmitted by the UPF 100 to the SMF 200 may be transmitted to the SMF 200 based on the delivery information included in the request message for the association setup received in the step S100. For example, in the step S130, an associated address and associated reliability of the session message to be transmitted by the UPF 100 to the SMF 200 may be determined and then transmitted based on the delivery information included in the request message for the association setup received in the step S100.

On the other hand, in a step S200, the SMF 200 may determine whether to update the association setup or not. If it is determined not to update the association setup, the step S130 may be repeatedly performed. However, if it is determined to update the association setup, in a step S300, the SMF 200 transmits a request message for the association update to the UPF 100. The request message for the association update may be generated by the message processing unit 230 of the SMF 200, and the request message for the association update includes the above-described delivery information.

Herein, the SMF 200 may determine whether to update the association setup or not based on at least one of the following matters.

Load status of an interface (e.g., the N4 interface or the SBI 600) between the SMF 200 and the UPF 100

Load status of an interface connected to the UPF 100 (e.g., an N3, an N6, an N9 interfaces, etc.)

Load status of an interface connected to the SMF 200 (e.g., an Nsmf interface)

Each resource status regarding interface processing (e.g., a CPU, a memory, a storage, etc.) of the UPF 100 or the SMF 200

Event status information for a message transmitted through an interface (e.g., establishment, modification, release of a session and a PDR, a QER, a FAR, a URR, etc. related thereto)

Alternatively, the SMF 200 may determine whether to update the association setup in case of receiving an update request from a NF such as an AMF or based on the following matters.

Wireless condition status (e.g., wireless signal status) of the UE 300

Whether a slice ID or an IP address of the UE 300 has been changed

Whether the UE 300 entered a specific area or exited the specific area

Predefined time

Whether the UE 300 subscribes to a predetermined service or terminates a subscribed service In a step S310, the UPF 100 updates the association according to the request message for the association update received in the step S300, and then, in a step S320, transmits a response message indicating that the update has been completed to the SMF 200.

Thereafter, in a step S330, various messages such as the session message are transmitted and received between the UPF 100 and the SMF 200. At this time, the session message to be transmitted by the UPF 100 to the SMF 200 may be transmitted to the SMF 200 based on the delivery information included in the request message for the association update received in the step S300. For example, in the step S330, the associated address and the associated reliability of the session message to be transmitted by the UPF 100 to the SMF 200 may be determined and then transmitted based on the delivery information included in the request message for the association update received in the step S300.

On the other hand, FIG. 7 illustrates a situation in which the request messages for the association setup or for the association update is transmitted from the SMF 200 to the UPF 100, but the idea of the present disclosure is not limited to that illustrated in FIG. 7. For example, the identical idea of the present disclosure may be applied to a situation in which the request messages for the association setup or for the association update is transmitted from the UPF 100 to the SMF 200.

On the other hand, the idea of the present disclosure described heretofore is applied to the case where the session message is transmitted between the SMF 200 and the UPF 100, but it is not understood that the idea of the present disclosure is limited to the case. In other words, even when a message is transmitted between the NFs shown in FIG. 1 according to an embodiment, the idea of the present disclosure may be applied. For example, the idea of the present disclosure may be applied to a case where a message is transmitted between the UPFs 100, a case where a message is transmitted between the SMFs 200, a case where a message is transmitted between the AMF and the SMF 200, a case where a message is transmitted between the PCF and the SMF 200, etc. In this case, one of subjects that transmits and receives a message may be referred to as a NF and the other subject may be referred to as another NF.

As described above, according to an embodiment, a message transmitted between the SMF 200 and the UPF 100 may be transmitted based on the delivery information. At this time, the associated address used for the message delivery is not bound to a specific value and may be selected from a number of values, and the seq. No may also be selectively assigned to the message. Therefore, overload and delay in the message delivery may be prevented, and stability of the message delivery may also be improved, thereby enabling connection without delay, QoS guarantee, and real-time billing. In addition, since the associated address is assigned to each message, bypass for various switches or routers is possible.

According to an embodiment, when the message is transmitted, the overload and the delay may be prevented, and the stability of the message delivery may also be improved, thereby enabling connection without delay, QoS guarantee, and real-time billing.

On the other hand, the above-described embodiments of the present disclosure may be implemented in form of a computer-readable storage medium storing a computer program programmed to perform each step included in the method or the computer program, stored in the computer-readable storage medium, programmed to perform each step included in the method.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A network function (NF) comprising:
a receiver configured to receive, from another NF, a first message regarding association between the NF and the another NF, the first message including delivery information on a second message to be transmitted to the another NF; and
a processor configured to:
obtain delivery information designated for each message type using the first message,
select, from a list of resources included in the delivery information, a resource based on a message type of a second message to be transmitted to the another NF, and
transmit, using the receiver, the second message to the another NF using the selected resource,
wherein the list of resources indicates resources of the another NF that the NF can select, when the NF transmits the second message to the another NF, and
wherein an IP and a port, used for transmission of the second message, are designated as among a plurality of IPs and a plurality of ports supported by the another NF, based on the delivery information.

2. The network function of claim 1, wherein if the NF is a session management function (SMF), the another NF is a user plane function (UPF), and
if the NF is the UPF, the another NF is the SMF.

3. The network function of claim 1, wherein the delivery information includes at least one of message type information of a message, an associated address used for message delivery, associated reliability regarding the message delivery, and a resource priority.

4. The network function of claim 3, wherein the message type information is classified based on a packet detection rule (PDR), a forward action rule (FAR), a QoS enforcement rule (QER) or a usage report rule (URR) included in the message.

5. The network function of claim 3, wherein the associated address used for the message delivery includes at least one of a source IP, a destination IP, a source port, and a destination port of the message.

6. The network function of claim 3, wherein the associated reliability regarding the message delivery includes at least one of a manner in which a specific number (seq. No) is assigned to a message, standby time (expiry timeout) before receiving a response to a request, and a maximum number of times (max. retry) of re-transmission.

7. The network function of claim 3, wherein the resource priority of the message is determined based on at least one of the message type information, the associated address used for the message delivery, and the associated reliability regarding the message delivery.

8. The network function of claim 1, wherein the first message regarding the association includes at least one of a setup message, an update message, and a release message of the association.

9. The network function of claim 8, wherein the processor is configured to receive the update message of the association according to change in at least one of status of an interface between the NF and the another NF, status of an interface connected to the NF, status of an interface connected to the another NF, each resource status of the NF and the another NF, status of a user equipment, or time information.

10. A packet processing method performed by a network function (NF), the method comprising:
receiving, from another NF, a first message regarding association between the NF and the another NF;
obtaining, from the received first message, delivery information designated for each message type using the first message;
selecting, from a list of resources included in the delivery information, a resource based on a message type of a second message to be transmitted to the another NF; and
transmitting, to the another NF, the second message using the selected resource,
wherein the list of resources indicates resources of the another NF that the NF can select, when transmitting the second message to the another NF, and wherein an IP and a port, used for transmission of the second message, are designated as among a plurality of IPs and a plurality of ports supported by the another NF, based on the delivery information.

11. The packet processing method of claim 10, wherein if the NF is a session management function (SMF), the another NF is a user plane function (UPF), and if the NF is the UPF, the another NF is the SMF.

12. The packet processing method of claim 11, wherein the delivery information includes at least one of message type information of a message, an associated address used for message delivery, associated reliability regarding the message delivery, and a resource priority.

13. The packet processing method of claim 12, wherein the message type information is classified based on a packet detection rule (PDR), a forward action rule (FAR), a QoS enforcement rule (QER) or a usage report rule (URR) included in the message.

14. The packet processing method of claim 12, wherein the associated address used for the message delivery includes at least one of a source IP, a destination IP, a source port, and a destination port of the message.

15. The packet processing method of claim 12, wherein the associated reliability regarding the message delivery includes at least one of a manner in which a specific number (seq. No) is assigned to a message, standby time (expiry timeout) before receiving a response to a request, and a maximum number of times (max. retry) of re-transmission.

16. The packet processing method of claim 12, wherein the resource priority of the message is determined based on at least one of the message type information, the associated address used for the message delivery, and the associated reliability regarding the message delivery.

17. The packet processing method of claim 10, wherein the first message regarding the association includes at least one of a setup message, an update message, and a release message of the association.

18. The packet processing method of claim 17, wherein the receiving the first message is receiving the update message of the association according to change in at least one of status of an interface between the NF and the another NF, status of an interface connected to the NF, status of an interface connected to the another NF, each resource status of the NF and the another NF, status of a user equipment, or time information.

* * * * *